F. M. PEDEN.
BINDER ATTACHMENT.
APPLICATION FILED JAN. 17, 1920.
1,397,821.
Patented Nov. 22, 1921.
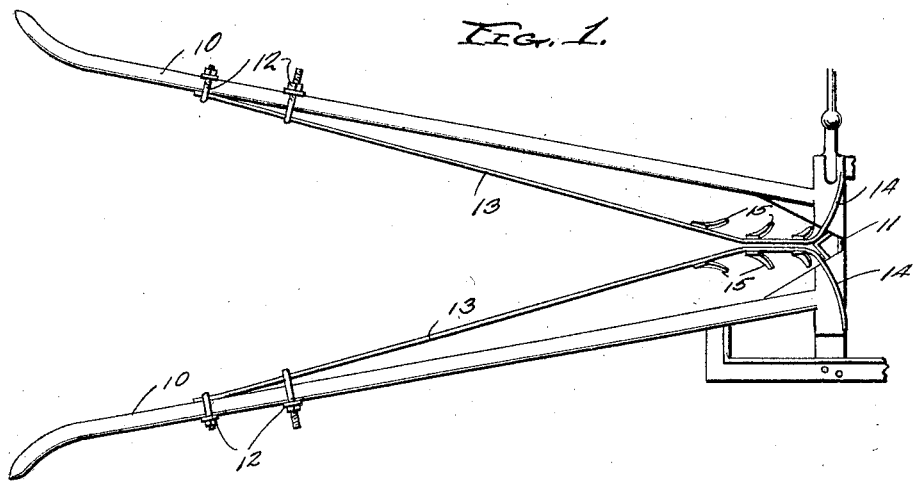
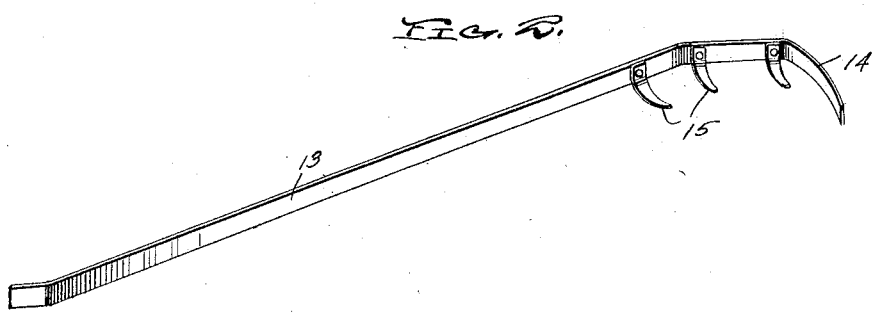
Inventor
Francis M. Peden
By
Chandlee Chandlee
Attorneys.

UNITED STATES PATENT OFFICE.

FRANCIS M. PEDEN, OF LOCO, OKLAHOMA, ASSIGNOR OF ONE-HALF TO E. P. LOWERY, OF LOCO, OKLAHOMA.

BINDER ATTACHMENT.

1,397,821.  Specification of Letters Patent.  Patented Nov. 22, 1921.

Application filed January 17, 1920. Serial No. 352,094.

*To all whom it may concern:*

Be it known that I, FRANCIS M. PEDEN, a citizen of the United States, residing at Loco, in the county of Stephens, State of Oklahoma, have invented certain new and useful Improvements in Binder Attachments; and I do hereby declare the following to be a full, clear, and exact description of the invention, such as will enable others skilled in the art to which it appertains to make and use the same.

This invention relates to new and useful improvements in harvesters and particularly to corn harvesters.

The principal object of the present invention is to provide a novel and improved means for use in connection with the gathering arms of the harvester to prevent the entrance of grass, weeds, and the like, from passing to the cutting knife.

Another object is to provide a novel and improved device which will deflect the grass and weeds downwardly and laterally away from the knife.

Another object is to provide novel and improved tension means which are disposed to yield under the pressure of the corn stalks to permit them to pass to the knife, but which will resist the pressure of grass and weeds, the said tension means being provided with means to deflect the grass and weeds downwardly so that they will pass beneath the knife.

Other objects and advantages will be apparent from the following description when taken in connection with the accompanying drawing.

In the drawing:

Figure 1 is a top plan view of the gathering arms of a corn harvester showing the invention applied thereto.

Fig. 2 is a perspective view of one of the spring tension members removed.

Referring particularly to the accompanying drawing, 10 represents the gathering arms of the corn harvester which extend forwardly and in divergent relation from the front end of the harvester. At the inner convergent ends of the arms is located the cutter 11.

Engaged around the forward portion of each arm 10 are the clips 12 which clamp the forward end of a long leaf spring 13 to the arm. This spring extends rearwardly toward the cutter at an oblique angle to the inner face of the arm, and has its rear end curved outwardly, as shown at 14. The portions of the springs immediately forward of the cutter are disposed in close contact with each other, and are adapted to be pushed apart by a corn stalk as the stalk passes to the cutter, but to resist the passage therebetween of any grass or weeds.

Carried by the contacting portions of the springs, and adjacent thereto, are the downwardly and laterally and rearwardly extending fingers 15 which are arranged to engage the heads of the grass and weeds and press them downwardly and laterally from the contacting portions of the springs, thereby precluding their positioning themselves in advance of the said portions of the springs and access to the cutter.

By adjusting the innermost of the clips 12 the firmness with which the contacting portions of the springs engage each other can be easily regulated. The attachment thus insures the proper and easy operation of the harvester to cut the standing stalks without interference of grass or weeds, the latter being positively excluded from access to the cutter. The device is readily capable of use with the ordinary harvester without changes.

What is claimed is:

A weed and grass excluding attachment for a harvester comprising forwardly extending resilient arms, means for adjustably connecting the resilient arms to the gathering arms of the harvester, said resilient arms having their rear portions yieldably contacting and laterally directed away from each other, and downwardly and rearwardly and laterally extending weed and grass deflecting elements carried by the resilient arms.

In testimony whereof, I affix my signature, in the presence of two witnesses.

FRANCIS M. PEDEN.

Witnesses:
EUGENE R. BAGGETT,
J. BELL.